US009104447B2

(12) United States Patent
Fletcher et al.

(10) Patent No.: US 9,104,447 B2
(45) Date of Patent: Aug. 11, 2015

(54) RESTORING A PREVIOUS VERSION OF A VIRTUAL MACHINE IMAGE

(71) Applicant: International Business Machines Corporation, Armonk, NY (US)

(72) Inventors: James C. Fletcher, Apex, NC (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 13/692,707

(22) Filed: Dec. 3, 2012

(65) Prior Publication Data

US 2014/0157263 A1  Jun. 5, 2014

(51) Int. Cl.
| | |
|---|---|
| G06F 9/455 | (2006.01) |
| G06F 11/14 | (2006.01) |
| G06F 11/07 | (2006.01) |
| H04L 29/06 | (2006.01) |
| G06F 21/56 | (2013.01) |
| G06F 11/34 | (2006.01) |

(52) U.S. Cl.
CPC ............ *G06F 9/455* (2013.01); *G06F 11/0712* (2013.01); *G06F 11/1402* (2013.01); *G06F 11/1458* (2013.01); *G06F 11/1469* (2013.01); *G06F 11/1484* (2013.01); *H04L 63/14* (2013.01); *G06F 11/1438* (2013.01); *G06F 11/3409* (2013.01); *G06F 11/3476* (2013.01); *G06F 21/56* (2013.01); *G06F 2201/83* (2013.01)

(58) Field of Classification Search
None
See application file for complete search history.

(56) References Cited

U.S. PATENT DOCUMENTS

| 8,176,558 B2* | 5/2012 | Kuwamura ..................... 726/24 |
|---|---|---|
| 2006/0225065 A1 | 10/2006 | Chandhok et al. |
| 2007/0192459 A1 | 8/2007 | Horimoto et al. ............. 709/223 |
| 2008/0147956 A1 | 6/2008 | Rawson ........................... 711/6 |
| 2008/0263658 A1* | 10/2008 | Michael et al. ................. 726/22 |
| 2009/0138541 A1 | 5/2009 | Wing et al. .................... 709/201 |
| 2010/0162039 A1 | 6/2010 | Goroff et al. ..................... 714/6 |
| 2011/0113206 A1 | 5/2011 | Heim |

FOREIGN PATENT DOCUMENTS

| CA | 2055193 | 5/1992 | ............. H04L 12/56 |
|---|---|---|---|
| JP | 2009080692 | 4/2009 | ............. G06F 11/20 |
| JP | 2009080705 | 4/2009 | ............. G06F 11/20 |

OTHER PUBLICATIONS

Hou et al., "HydraVM: Low-Cost, Transparent High Availability for Virtual Machines," Hewlett-Packard Development Co., Feb. 2011, 13 pages.
"Virtual Machine Backup Guide," VMWare Inc., 2006, 74 pages.
(Continued)

*Primary Examiner* — Qing Wu
(74) *Attorney, Agent, or Firm* — VanLeeuwen & VanLeeuwen; Jeffrey S. LaBaw (57) ABSTRACT

An approach is provided to apply a virtual machine (VM) image to a computer system. In the approach, implemented by an information handling system, a detection is made that a current VM image executing on the computer system is experiencing a problem. In response, prior VM images are analyzed, with each of the prior VM images being an image that was previously executed on the computer system. Based on the analysis, one of the prior VM images is selected and the selected image is used to replace the current VM image on the computer system.

18 Claims, 6 Drawing Sheets

(56) References Cited

OTHER PUBLICATIONS

"Method of Saving and Restoring the State of a Virtual Machine Guest Controller Software in Case of Failure/Crash or User Request," Siemens AG, IP.com No. IPCOM000205582D, Mar. 31, 2011, 5 pages.

Anonymous, "Methods and Approach to Minimize Downtime of Server Virtual Machines Due to Failure of Disk in the Storage Device," IP.com No. IPCOM000196623D, Jun. 9, 2010, 5 pages.
"Veeam Backup & Replication for VMware," Veeam Software, 2009, 2 pages.
International Search Report and Written Opinion for PCT application PCT/EP2013/066583 (filed Aug. 7, 2013, Applicant—International Business Machines Corporation), mailed Nov. 18, 2013, 12 pages.

* cited by examiner

RESTORING A PREVIOUS VERSION OF A VIRTUAL MACHINE IMAGE

TECHNICAL FIELD

The present disclosure relates to an approach that restores a virtual machine image based on previously gathered resource metrics.

BACKGROUND OF THE INVENTION

Once it is recognized that a virtual image (VM) is behaving poorly, through the use of a range of current art techniques, and it is determined that a fallback to a prior version is needed, there are no clear means to determine which prior image should be used. Simply rolling back to the most recent prior version may not resolve the issue, consequently the customer may have to iteratively revert to other prior versions until a good, stable image is found. There is currently no clear method to determine to which prior release to revert to beyond "random choice". Current systems typically revert to the immediate prior version of the VM, doing so without any level of evaluation of what was driving the undesirable behavior in the current version. Change management systems exist today to indicate when and why a change was made but these systems are consulted by humans instead of providing an automated rationale for determining the rollback version. Thus, these prior art approaches are prone to human error, and require human-driven analysis time to determine an appropriate image.

SUMMARY

An approach is provided to apply a virtual machine (VM) image to a computer system. In the approach, implemented by an information handling system, a detection is made that a current VM image executing on the computer system is experiencing a problem. In response, prior VM images are analyzed, with each of the prior VM images being an image that was previously executed on the computer system. Based on the analysis, one of the prior VM images is selected and the selected image is used to replace the current VM image on the computer system. In one embodiment, a current problem signature related to the problem detected in the current VM image is created and this problem signature is compared with historic problem signatures that correspond with the prior VM images. In a further embodiment, any of the prior VM images that exhibit the same problem signature detected in the current VM image are rejected. Those problem signatures that do not match the current problem signature are qualitatively analyzed to identify the "best" prior VM image that can be used on the computer system. In some cases, a historic problem signature may indicate no problems with the corresponding prior VM image. Problem signatures corresponding to prior VM images can be generated by analyzing resource metrics that were gathered while the prior VM images were running on the computer system. In one environment, one computer system is used to manage the virtual machines running on a number of computer systems with the managing computer system performing the analysis of problem data and the selection of the prior VM image that should be applied on the various computer systems.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
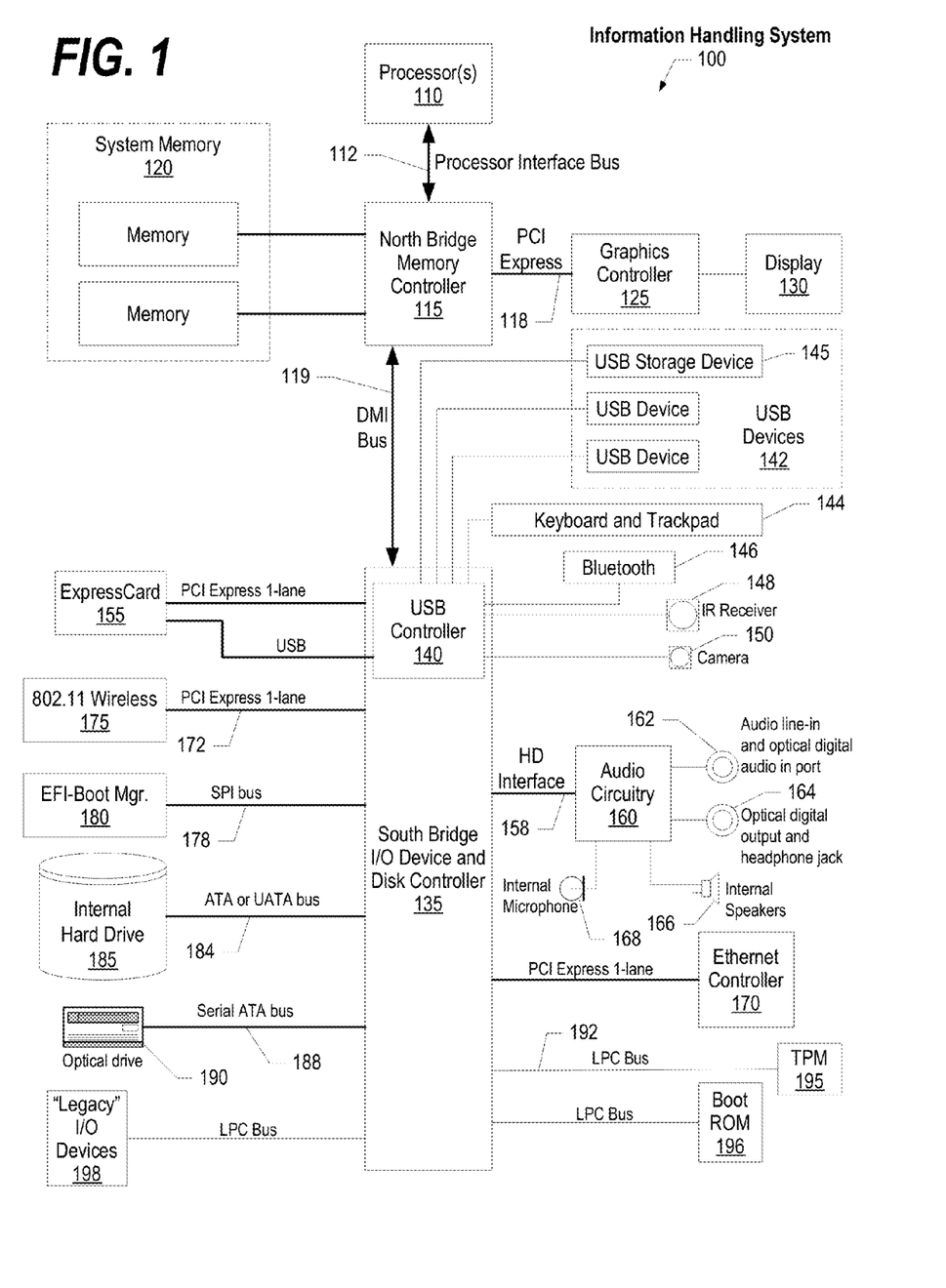
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
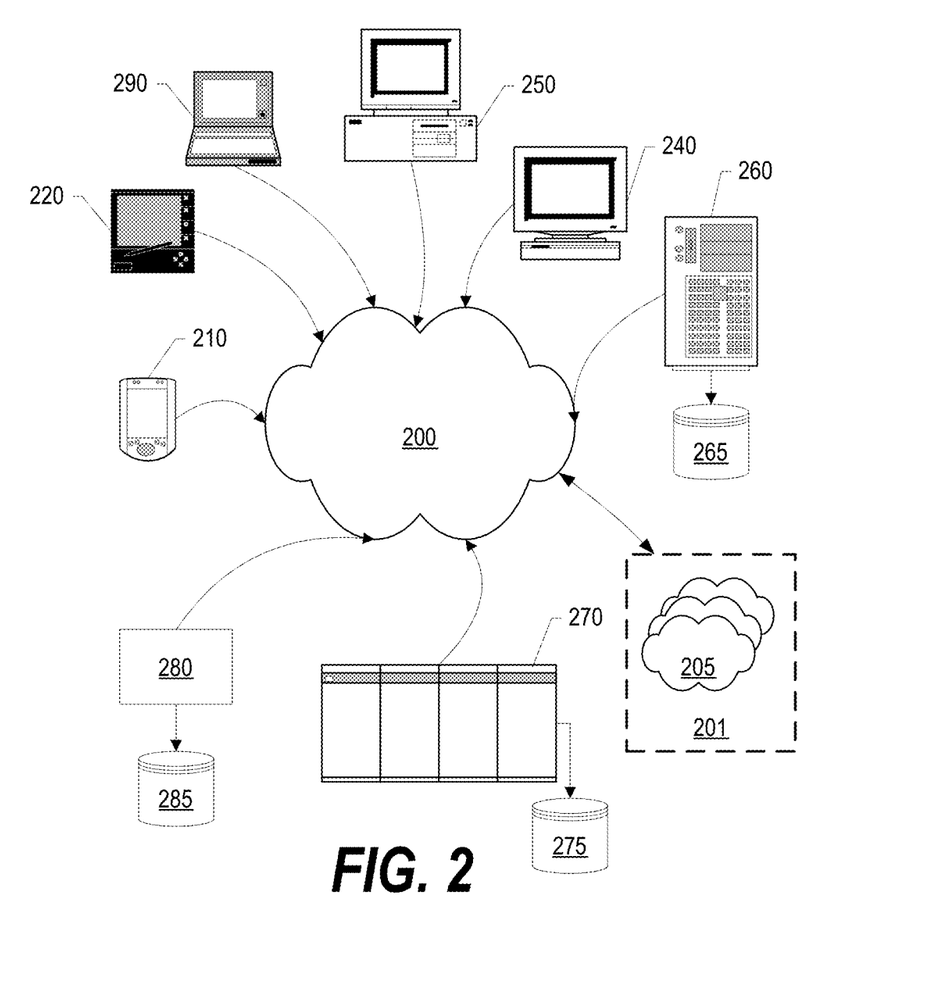
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-6 depict an approach that can be executed on an information handling system and computer network as shown in FIGS. 1-2. While change management systems have information on when and why a change occurred, the current systems do not identify suitable prior virtual machines so the process of reverting to a prior release is at best a best guess, human driven process. The approach provided herein couples a change management system with an automated historical pattern matching system for known prior performance of a virtual machine on a computer system. In this manner, a prior release of the application/virtual image that did not demonstrate the failing pattern is identified and applied to the computer system. The process described herein detects the failing pattern and leverages change history data regarding performance of the virtual machine in order to determine the prior release of the virtual machine that best reduces the failing pattern. The system archives and associates performance and event data with a specified virtual image to identify the "best" virtual machine image to apply to the computer system. In addition, the process can be repeated in the event the pattern had not previously occurred but did occur when the reversion to the prior VM image was applied.

Figure 3:
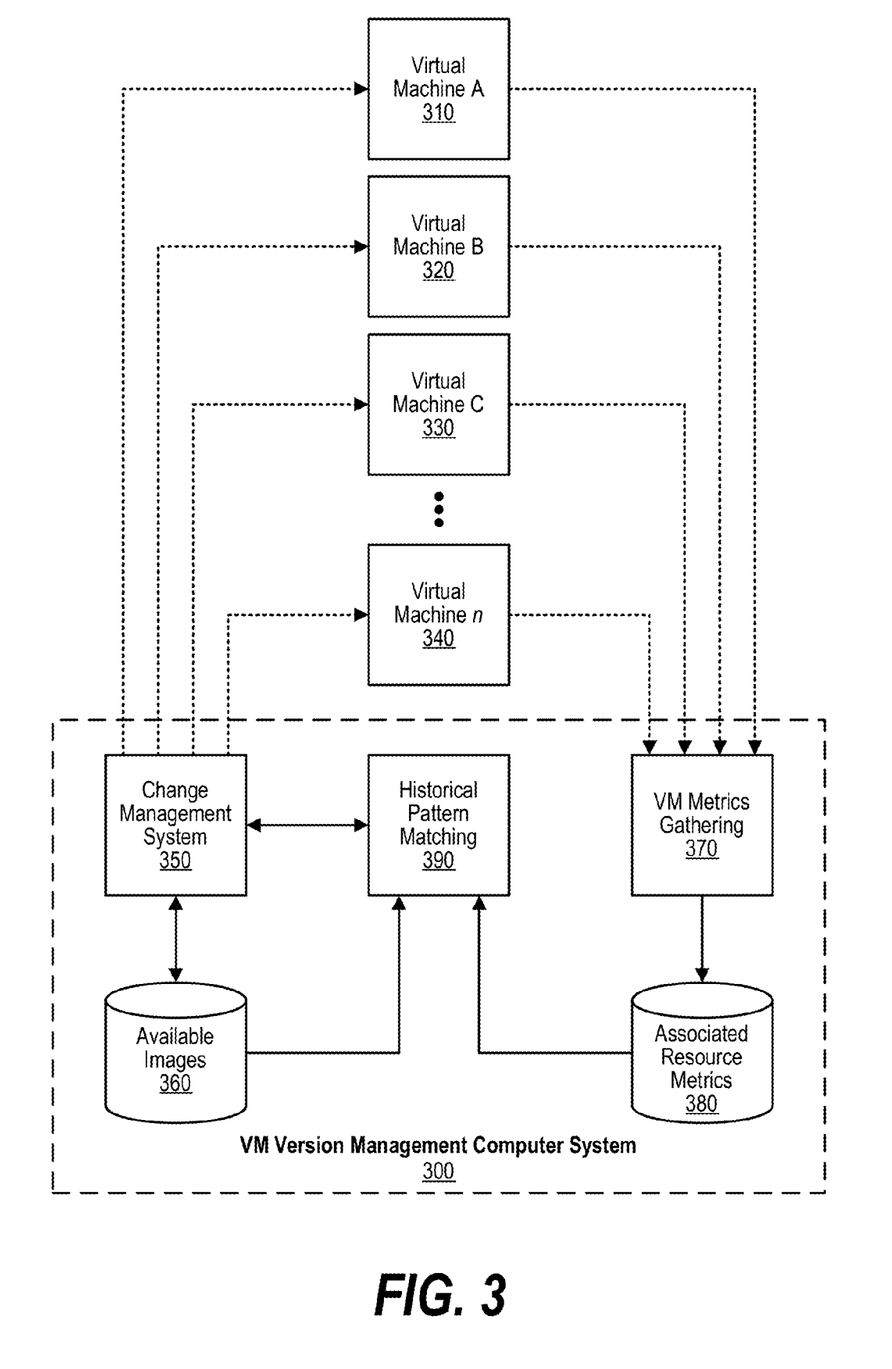
FIG. 3 is a component diagram showing a virtual machine (VM) version management system.

FIG. 3 is a component diagram showing a virtual machine (VM) version management system. VM version management computer system 300 is a computer system that maintains change management data and resource metric data in order to manage the VM image that is currently running on the various managed computer systems. In the example shown, VM version management computer system 300 is managing the virtual machines currently applied to a number of computer systems (VM A (310), VM B (320), VM C (330) through VM n (340)).

Components utilized by VM version management system 300 include change management system 350, VM resource metrics gathering system 370, and historical pattern matching system 390. Change management system 350 is used to keep track of the VMs currently applied by the various computer systems as well as metadata regarding the installations (e.g., date at which the current VM was applied, previous VMs applied at the computer systems and corresponding dates, etc.). VM resource metrics gathering system 370 is used to periodically gather resource metrics (e.g., availability, response time, channel capacity, latency, completion time, service time, bandwidth, throughput, relative efficiency, scalability, performance per watt, compression ratio, instruction path length and speed up, etc.). The resource metrics are stored in resource metrics data store 380. Historical pattern matching process 390 analyzes resource metrics from data store 380 for available VM images stored in data store 360. In this manner, the process can identify whether a problem that is currently hampering a computer system was also a problem for a prior VM image based on whether the resource metrics of the prior VM image match, or are similar to, the resource metrics currently exhibited by the currently installed VM image. In addition, historical pattern matching process 390 can identify whether prior VM images from data store 360 exhibited different problems by analyzing the historical resource metrics that were gathered while the prior VM images were running on the computer system. In this manner, the historical pattern matching system can identify a prior VM image that did not exhibit problems or, if problems were exhibited, are better than the problem currently being exhibited by the currently installed VM image. When an appropriate ("best") prior VM image is identified, the historical pattern matching process informs change management process 350 which takes care of applying the selected prior VM image onto the computer system and updating metadata regarding the VM images accordingly.

Figure 4:
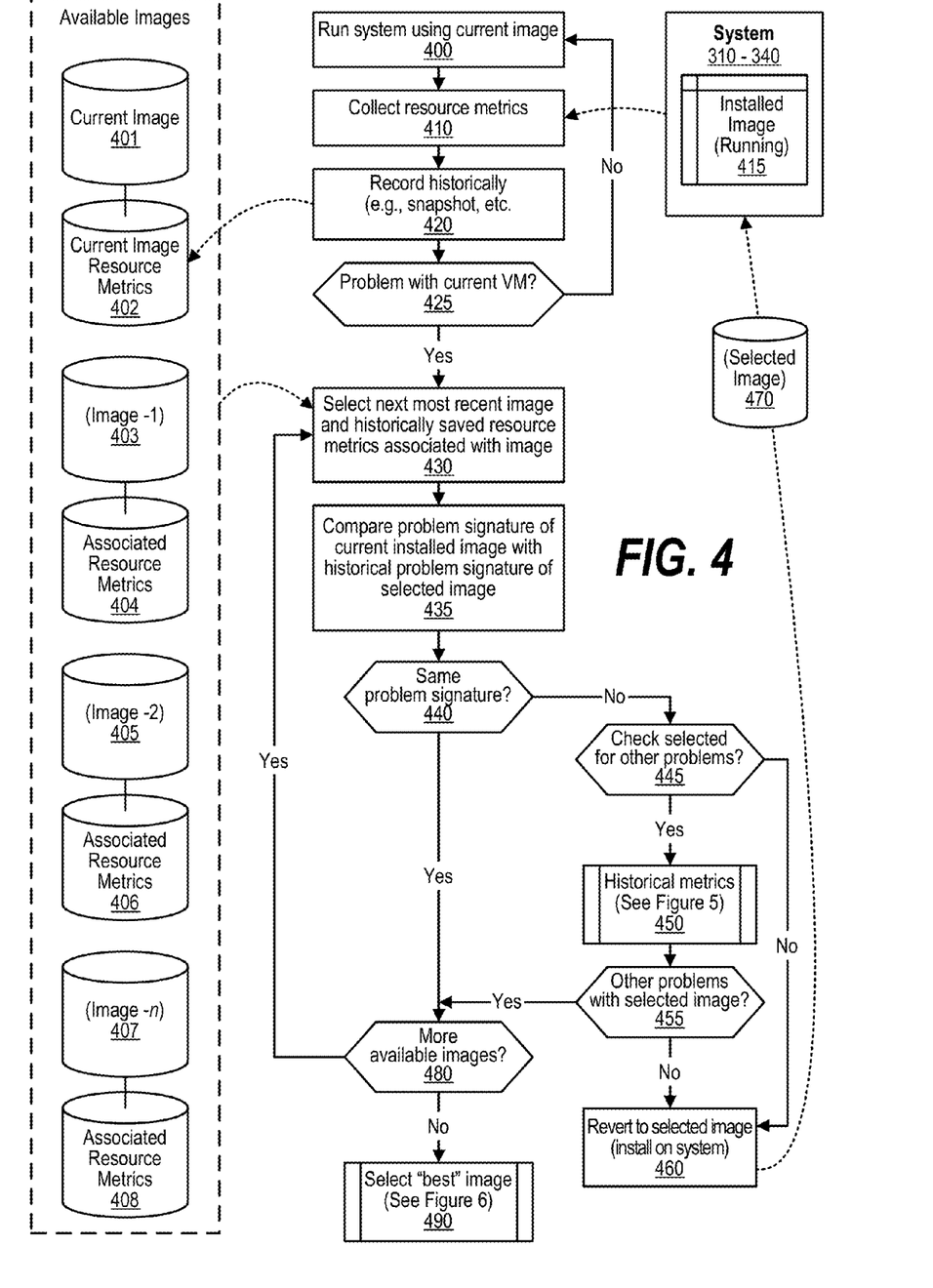
FIG. 4 is a flowchart showing the steps taken by the VM version management system.

FIG. 4 is a flowchart showing the steps taken by the VM version management system. At step 400, a computer system is executing a current VM image. While the current VM image (415) is executing on a computer system (systems 310 through 340), at various times resource metrics (e.g., availability, response time, channel capacity, latency, completion time, service time, bandwidth, throughput, relative efficiency, scalability, performance per watt, compression ratio, instruction path length and speed up, etc.) are collected, at step 410, and recorded at step 420 into current VM resource metrics data store 402. Available VM images each have resource metric data associated with them. Current image 401 is the VM image that is currently running on the computer system. Resource metrics pertaining to the current image are stored in current VM image resource metrics data store 402. Likewise, prior VM images that have been executed on the computer system also have resource metrics that pertain to these VM images that were collected and stored while the prior VM images were executing on the computer system. VM image-1 (403) is the VM image that most recently was running on the computer system prior to the current VM image being applied and the resource metrics that were collected and stored while VM image-1 (403) was running are stored in resource metrics data store 404. Likewise, VM image-2 (405) is the VM image that was running on the computer system just prior to VM image-1 being applied. The resource metrics that were collected and stored while VM image-2 (405) was running are stored in resource metrics data store 406. Any number of prior VM images can be utilized, as denoted by VM image-n (407) with resource metrics data store 408 pertaining to VM image-n.

A monitor, such as VM version management computer system 300, is used to detect whether a problem is being exhibited by the VM that is currently being executed by the computer system. A determination is made (e.g., by the monitor) as to whether the current VM image (415) is experiencing a problem (decision 425). The decision can be based on one or more of the resource metrics being above or below a particular threshold for a given amount of time, etc. If no problem is being experienced (or has yet been detected), then decision 425 branches to the "no" branch which loops back to continue executing the VM image and continue collecting resource metrics. The system continues to collect and record resource metrics corresponding to the VM image that is currently running. When a problem with the currently running VM image is detected, decision 425 branches to the "yes" branch for further processing that analyzes prior VM images and determines which VM image should be applied to the computer system.

At step 430, the most recent prior VM image and its historically saved resource metrics (e.g., image-1 (403) and resource metrics (404)) are selected. In the embodiment shown, prior VM images are selected from most recently used to oldest, however other approaches could be used with prior VM images selected based on another criteria. At step 435, the problem signature of the current installed VM image is created (if not yet created) and compared to the historical problem signature of the selected image. Again, if the resource metric data does not include problem signature(s) of the prior VM images, then the problem signature is generated based on the selected resource metrics. A determination is made as to whether the same problem signature exists in both the current VM image as well as the selected prior VM image (decision 440). The process is attempting to identify prior VM images that do not exhibit the same problem that is being experienced with the currently installed VM image. So, if the same problem signature does not exist in the selected prior VM image, decision 440 branches to the "no" branch for further processing to ascertain if the selected prior VM image should be applied to the computer system.

A determination is made as to whether the process is configured to check the selected prior VM image's historical resource metric data for other problem signatures that may have been exhibited by the selected prior VM image when it was installed (applied) to the computer system (decision 445). If the process is configured to identify the first prior VM image that does not exhibit the problem currently being experienced by the currently installed VM image, then decision 445 branches to the "no" branch whereupon, at step 460, the selected prior VM image is applied to the computer system (replacing the currently installed VM image). On the other hand, if the process is configured to check for other problem signatures, then decision 445 branches to the "yes" branch for further analysis.

Figure 5:
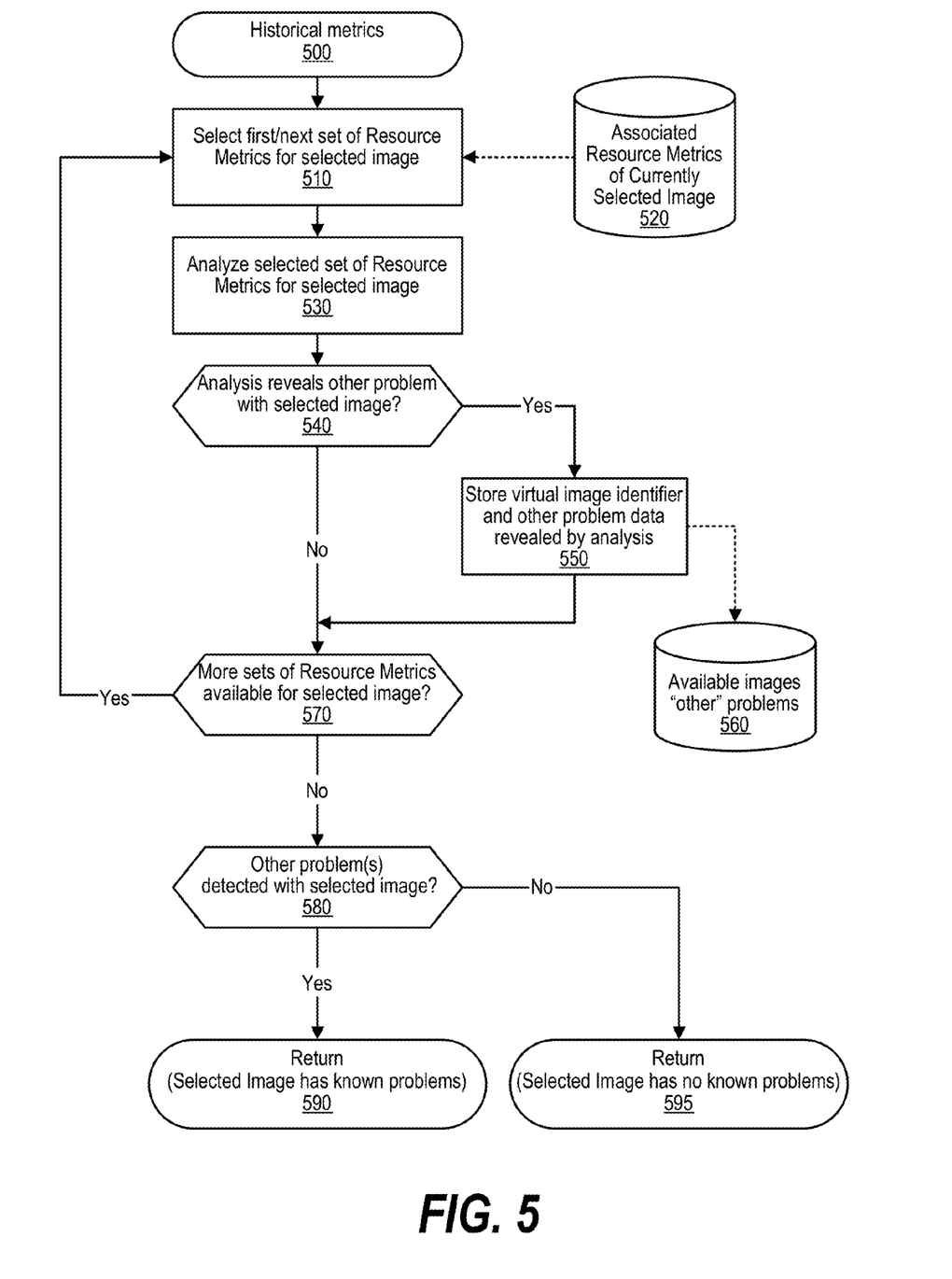
FIG. 5 is a depiction of a flowchart showing the logic used in the analysis of historical metrics used to select a VM image.

At predefined process 450, historical metrics pertaining to the selected prior VM image (e.g., resource metrics data store 404) are analyzed in order to identify any other problem signatures that are evident in the selected VM image's resource metric data (see FIG. 5 and corresponding text for further processing details regarding the analysis of historical resource metrics). A determination is made as to whether other problem signatures were found by the analysis of the selected prior VM image's historical resource metrics (decision 455). If other problems were found in the selected prior VM image's historical resource metrics, decision 455 branches to the "yes" branch whereupon a determination is made as to whether there are additional prior VM images that can be selected and analyzed (decision 480). On the other hand, if the analysis reveals that the selected prior VM image's resource metrics do not reveal a problem, then decision 455 branches to the "no" branch whereupon, at step 460, the selected prior VM image is applied to the computer system (replacing the currently installed VM image).

Returning to decision 480, if there are additional prior VM images to process, then decision 480 branches to the "yes" branch which loops back to select and process the next prior VM image to determine if there is a prior VM image that does not exhibit problems. This looping continues until there are no more prior VM images to process, at which point decision 480 branches to the "no" branch whereupon, at predefined process 490, the "best" prior VM image is selected based on the analysis that was performed on their respective historical resource metric data (see FIG. 6 and corresponding text for further processing details).

FIG. 5 is a depiction of a flowchart showing the logic used in the analysis of historical metrics used to select a VM image. Processing commences at 500 when the routine is called by the main processing shown in FIG. 4 (see predefined process 450 in FIG. 4). At step 510, the process selects the first set of resource metrics corresponding to the currently selected prior VM image (shown as data store 520 in FIG. 5 and shown as data stores 404, 406, and 408 in FIG. 4). At step 520, the selected set of resource metrics is analyzed to identify any problem signatures that may be shown by the resource metrics. For example, resource metrics availability, response time, channel capacity, latency, completion time, service time, bandwidth, throughput, relative efficiency, scalability, performance per watt, compression ratio, instruction path length and speed up, etc. and patterns may include when one or more of these metrics crosses a particular threshold.

A determination is made as to whether the analysis revealed another problem with the selected image based on the selected set of resource metrics (decision 540). If the analysis revealed another problem with the selected prior VM image, then decision 540 branches to the "yes" branch whereupon, at step 550, the selected prior VM image identifier is stored along with the identified problem signature that was revealed by the analysis. The VM image identifier and problem signature data are retained in data store 560 for future analysis (if needed). On the other hand, if the analysis of the selected set of resource metrics did not reveal a problem (problem signature), then decision 540 branches to the "no" branch bypassing step 550.

A determination is made as to whether there are more sets of resource metrics available for analysis for the selected prior VM image (decision 570). If there are additional sets of resource metrics to analyze, then decision 570 branches to the "yes" branch which loops back to select and process the next set of resource metrics as described above. This looping continues until all sets of resource metrics associated with the selected prior VM image have been selected and analyzed, at which point decision 570 branches to the "no" branch for further processing.

A determination is made as to whether the analysis of the resource metrics detected any other problems (problem signatures) associated with the selected VM image (decision 580). If the analysis of the resource metrics revealed one or more other problems with the selected prior VM image, then decision 580 branches to the "yes" branch whereupon processing returns to the calling routine at 590 (see FIG. 4) with a return code indicating that problems were identified with the selected prior VM image (in which case the calling routine will keep analyzing prior VM images for problem signatures until a suitable image is identified). On the other hand, if the analysis of the resource metrics did not reveal any other problems with the selected prior VM image, then decision 580 branches to the "yes" branch whereupon processing returns to the calling routine at 595 (see FIG. 4) with a return code indicating that no problems were identified with the selected prior VM image (the selected prior VM image will then be applied to the computer system).

Figure 6:
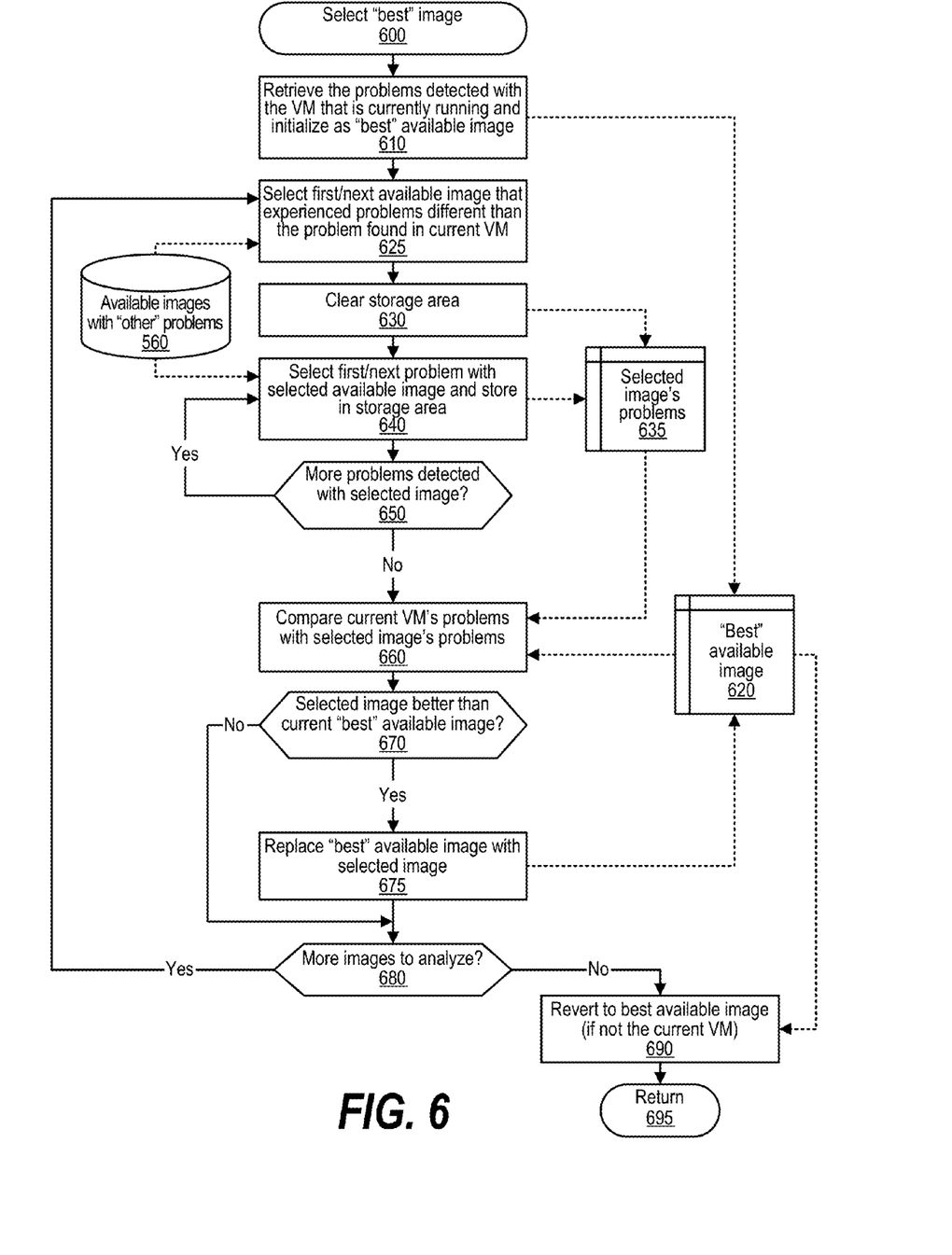
FIG. 6 is a depiction of a flowchart showing the logic used in the selection of the "best" virtual machine for a particular computing environment.

FIG. 6 is a depiction of a flowchart showing the logic used in the selection of the "best" virtual machine (VM) for a particular computing environment. The routine shown in FIG. 6 is called from FIG. 4 (predefined process 490) when the main routine is unable to identify a prior VM image because each of the prior VM images have one or more problem signatures associated with them. The routine shown in FIG. 6 selects the "best" prior VM image that will be applied to the computer system.

Processing commences at 600 whereupon, at step 610, the problems (problem signature data) associated with the currently running VM image are retrieved and stored in memory area 620 to initialize the "best" available VM image to the image that is currently running. Subsequent processing, as described below, will compare prior VM image problem data to the "best" available VM image and, when better, will replace the current "best" available image.

At step 625, the first available prior VM image is selected. This data is retrieved from data store 560 with data store 560 having been loaded with problem data using the processing previously executed and shown in FIG. 5. At step 630, a memory area (memory area 635) is cleared or otherwise initialized. At step 640 the first problem (problem signature data) that was identified for the selected prior VM image is selected and stored in memory area 635. A determination is made as to whether there were other problems (problem signature data) detected for the selected prior VM image (decision 650). If there were additional problems detected, then decision 650 branches to the "yes" branch which loops back to select the next problem (problem signature data) and store the next problem data into memory area 635. This looping continues until all of the problems associated with the selected prior VM image have been selected and stored in memory area 635, at which point decision 650 branches to the "no" branch for further processing.

At step 660, the problem data associated with the selected prior VM image is qualitatively compared with the current "best" available VM image problem data which was previously stored in memory area 620. A determination is made as to whether the selected prior VM image is better than the current "best" available VM image based on the comparison (decision 670). If the selected prior VM image is better than the current "best" available VM image, then decision 670 branches to the "yes" branch whereupon, at step 675, the current "best" available VM image is replaced by clearing memory area 620 and writing the selected prior VM image's identifier to memory area 620 along with the problem data associated with the selected prior VM image from memory area 635. On the other hand, if the selected prior VM image is not better than the current "best" available VM image, then decision 670 branches to the "no" branch bypassing step 675.

A determination is made as to whether there are additional prior VM images that have yet to be processed (decision 680). If there are additional prior VM images that have yet to be processed, then decision 680 branches to the "yes" branch which loops back to select the next prior VM image and compare the image's problem data to the "best" available image. In this manner, the problem data corresponding to each of the prior VM images is compared to the current "best" available VM image in order to identify the VM image that has problem data can be better managed than the problems detected in other available VM images. This looping continues until the problem data associated with all of the available VM images have been processed, at which point decision 680 branches to the "no" branch. At step 690, the "best" available VM image, as stored in memory area 620, is applied to the computer system. Of course, if the currently running VM image is found to be the "best" available image, then none of the prior VM images is applied to the system. Processing then returns to the calling routine (see FIG. 4) at 695.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
 a plurality of processors;
 a memory coupled to at least one of the processors;
 a nonvolatile storage area; and
 a set of instructions stored in the memory and executed by at least one of the processors to apply a virtual machine (VM) image to a computer system, wherein the set of instructions perform actions of:
  detecting that a current VM image executing on the computer system is experiencing a problem;
  analyzing one or more prior VM images utilizing one or more resource metrics captured while the one or more prior VM images were executing on the computer system;
  selecting one of the prior VM images based on the analysis; and
  replacing the current VM image with the selected prior VM image.

2. The information handling system of claim 1 wherein the set of instructions that perform the analysis perform additional actions comprising:
 creating a current problem signature related to the problem detected in the current VM image; and
 comparing the current problem signature with historic problem signatures that each correspond with one of the prior VM images.

3. The information handling system of claim 2 wherein the set of instructions perform additional actions comprising:
 rejecting, based on the comparison, each of the prior VM images with historic problem signatures matching the current problem signature.

4. The information handling system of claim 2 wherein the set of instructions perform additional actions comprising:
 identifying, based on the comparison, a set of one or more historic problem signatures that fail to match the current problem signature, wherein the selected prior VM image corresponds to a historic problem signature that is included in the set of one or more historic problem signatures.

5. The information handling system of claim 4 wherein the set of instructions perform additional actions comprising:
 comparing the set of one or more historic problem signatures, wherein the comparison results in a selected historic problem signature and wherein the selected prior VM image corresponds to the selected historic problem signature.

6. The information handling system of claim 4 wherein at least one of the historic problem signatures are non-problem signatures indicating that the corresponding prior VM images are problem free.

7. The information handling system of claim 6 wherein the selecting of one of the prior VM images further comprises:
 identifying a prior VM image with a non-problem signature, wherein the identified prior VM image is selected as the selected prior VM image.

8. The information handling system of claim 1 further comprising:
 analyzing the plurality of resource metrics corresponding to each of the prior VM images, the analysis resulting in the historic problem signatures corresponding to each of the prior VM images.

9. The information handling system of claim 1 wherein the analyzing and selecting are performed by a second computer system that manages VM images for a plurality of computer systems, including the computer system.

10. A computer program product stored in a non-transitory computer readable medium, comprising computer instructions that, when executed by an information handling system, applies a virtual machine (VM) image to a computer system by causing the information handling system to perform actions comprising:
 detecting that a current VM image executing on the computer system is experiencing a problem;
 analyzing one or more prior VM images utilizing one or more resource metrics captured while the one or more prior VM images were executing on the computer system;
 selecting one of the prior VM images based on the analysis; and
 replacing the current VM image with the selected prior VM image.

11. The computer program product of claim 10 wherein the analysis further comprises:
 creating a current problem signature related to the problem detected in the current VM image; and
 comparing the current problem signature with historic problem signatures that each correspond with one of the prior VM images.

12. The computer program product of claim 11 wherein the actions further comprise:
 rejecting, based on the comparison, each of the prior VM images with historic problem signatures matching the current problem signature.

13. The computer program product of claim 11 wherein the actions further comprise:
 identifying, based on the comparison, a set of one or more historic problem signatures that fail to match the current problem signature, wherein the selected prior VM image corresponds to a historic problem signature that is included in the set of one or more historic problem signatures.

14. The computer program product of claim 13 wherein the actions further comprise:
 comparing the set of one or more historic problem signatures, wherein the comparison results in a selected historic problem signature and wherein the selected prior VM image corresponds to the selected historic problem signature.

15. The computer program product of claim 13 wherein at least one of the historic problem signatures are non-problem signatures indicating that the corresponding prior VM images are problem free.

16. The computer program product of claim 15 wherein the selecting of one of the prior VM images further comprises:
 identifying a prior VM image with a non-problem signature, wherein the identified prior VM image is selected as the selected prior VM image.

17. The computer program product of claim 10 wherein the actions further comprise:
- analyzing the plurality of resource metrics corresponding to each of the prior VM images, the analysis resulting in the historic problem signatures corresponding to each of the prior VM images.

18. The computer program product of claim 10 wherein the analyzing and selecting are performed by a second computer system that manages VM images for a plurality of computer systems, including the computer system.

* * * * *